(12) United States Patent
Shenderova et al.

(10) Patent No.: US 10,793,795 B1
(45) Date of Patent: Oct. 6, 2020

(54) NANOCARBON PARTICLE BASED FUEL ADDITIVE

(71) Applicant: Adámas Nanotechnologies Inc., Raleigh, NC (US)

(72) Inventors: Olga Aleksandrovna Shenderova, Raleigh, NC (US); Michail Grigorievich Ivanov, Ekaterinburg (RU); Gary Elder McGuire, Chapel Hill, NC (US); Denis Ivanov, Ekaterinburg (RU)

(73) Assignee: Adámas Nanotechnologies, Inc., Raleigh, NC (US)

( * ) Notice: Subject to any disclaimer, the term of this patent is extended or adjusted under 35 U.S.C. 154(b) by 615 days.

(21) Appl. No.: 14/614,010

(22) Filed: Feb. 4, 2015

Related U.S. Application Data

(60) Provisional application No. 61/935,905, filed on Feb. 5, 2014.

(51) Int. Cl.
| | | |
|---|---|---|
| *C10L 1/10* | (2006.01) | |
| *C10L 10/02* | (2006.01) | |
| *C10L 10/08* | (2006.01) | |
| *F02B 43/02* | (2006.01) | |
| *C10L 1/12* | (2006.01) | |

(Continued)

(52) U.S. Cl.
CPC ............... *C10L 1/10* (2013.01); *C10L 10/02* (2013.01); *C10L 10/08* (2013.01); *F02B 43/02* (2013.01); *C10L 1/1208* (2013.01); *C10L 1/1824* (2013.01); *C10L 1/191* (2013.01); *C10L 1/1915* (2013.01); *C10L 1/205* (2013.01); *C10L 1/224* (2013.01); *C10L 1/2437* (2013.01); *C10L 2200/025* (2013.01); *C10L 2200/029* (2013.01); *C10L 2200/0259* (2013.01); *C10L 2200/043* (2013.01); *C10L 2200/0423* (2013.01); *C10L 2200/0446* (2013.01); *C10L 2230/22* (2013.01); *C10L 2270/023* (2013.01);

(Continued)

(58) Field of Classification Search
CPC combination set(s) only.
See application file for complete search history.

(56) References Cited

U.S. PATENT DOCUMENTS

| | | |
|---|---|---|
| 5,039,438 A | 8/1991 | Thermet et al. |
| 5,578,387 A | 11/1996 | Kai et al. |

(Continued)

FOREIGN PATENT DOCUMENTS

EP 1953214 A1 8/2008

OTHER PUBLICATIONS

Reid, et al., "Development of Highly Active Titania-Based Nanoparticles for Energetic Materials", The Journal of Physical Chemistry, C 2011, 115, 10412-10418, American Chemical Society, 2011.

(Continued)

*Primary Examiner* — Lindsay M Low
*Assistant Examiner* — Ruben Picon-Feliciano
(74) *Attorney, Agent, or Firm* — James G. Passé; Passé Intellectual Property, LLC

(57) ABSTRACT

A fuel additive composition has a base fuel; colloidal nanocarbon particles, and a dispersion stabilizer that aids in stably suspending the colloidal nanocarbon particles in the base fuel. This abstract is not to be considered limiting, since other embodiments may deviate from the features described in this abstract.

27 Claims, 3 Drawing Sheets

(51) Int. Cl.
*C10L 1/224* (2006.01)
*C10L 1/19* (2006.01)
*C10L 1/24* (2006.01)
*C10L 1/182* (2006.01)
*C10L 1/20* (2006.01)

(52) U.S. Cl.
CPC ..... *C10L 2270/026* (2013.01); *C10L 2290/08* (2013.01); *C10L 2290/24* (2013.01); *C10L 2290/34* (2013.01)

(56) References Cited

U.S. PATENT DOCUMENTS

| | | |
|---|---|---|
| 8,333,945 B2 | 12/2012 | McLaughlin et al. |
| 8,679,344 B2 | 3/2014 | Allston et al. |
| 8,741,821 B2 | 6/2014 | Jao et al. |
| 2008/0248979 A1 | 10/2008 | Nakagawa et al. |
| 2009/0042751 A1 | 2/2009 | Narayan |
| 2011/0117361 A1* | 5/2011 | Hamilton .............. C01B 32/182 428/333 |
| 2011/0256049 A1* | 10/2011 | Dickinson, III ....... B82Y 30/00 423/445 R |
| 2012/0122743 A1* | 5/2012 | Ivanov ................ C10M 141/04 508/117 |
| 2012/0124899 A1 | 5/2012 | Difrancesco et al. |
| 2012/0151931 A1 | 6/2012 | Zheng |

OTHER PUBLICATIONS

Sabourin, et al., "Functionalized Graphene Sheet Colloids for Enhanced Fuel/Propellant Combustion", ACS Nano, vol. 3, No. 12, American Chemical Society, 2009.
Sajith, et al., "Experimental Investigations on the Effects of Cerium Oxide Nanoparticle Fuel Additives on Biodiesel", Hindawi Publishing Corporation, Advances in Mechanical Engineering, vol. 2010, Article ID 581407, 2010.
Anonamous, HERA, "Human & Environmental Risk Assessment on ingredients of household cleaning products—2-(2-Butoxyethoxy)ethanol, CAS No. 112-34-5", Edition 1.0, Aug. 2005.
Anonamous, "Exploring Nano-sized Fuel Additives", EPA Science Matters Newsletter, Apr. 2011, 2013.
Soutter, "Nanoparticles as Fuel Additives", AZONANO, Sep. 3, 2012.
Law, "Fuel Options for Next-Generation Chemical Propulsion", AIAA Journal, vol. 50., No. 1, Jan. 2012.
Lenin, et al., "Performance and emission characteristics of a DI diesel engine with a nanofuel additive" Elsevier Ltd., 2013.

* cited by examiner

NANOCARBON PARTICLE BASED FUEL ADDITIVE

CROSS REFERENCE TO RELATED DOCUMENTS

This application is related to and claims priority benefit of U.S. Provisional Patent Application 61/935,905 filed Feb. 5, 2014 to Shenderova, et al. which is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Additives are often used in fuels such as gasoline to accomplish such functions as removal of water, cleaning fuel systems and improvement in engine wear and fuel efficiency.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings.

GLOSSARY

Figure 1:
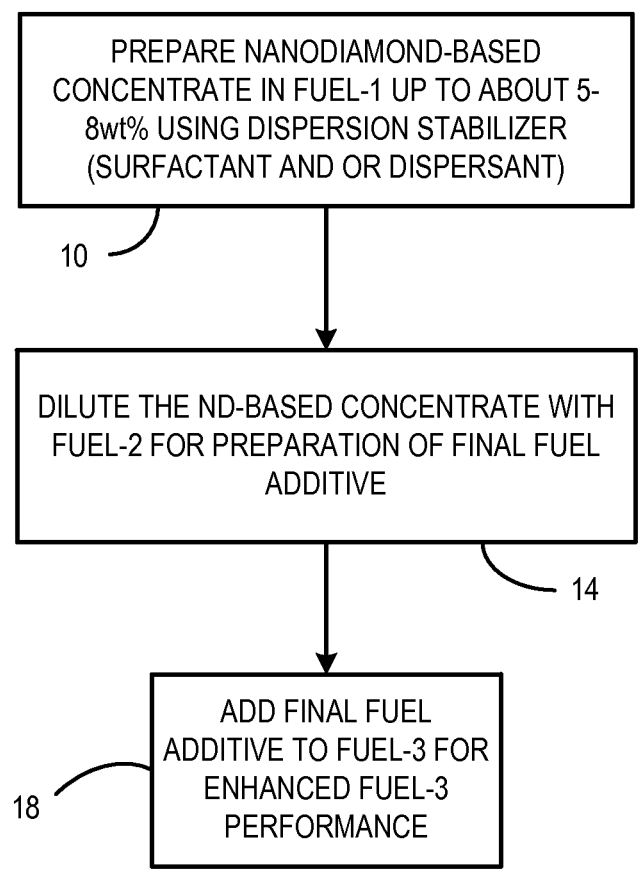
FIG. 1 is an example process for preparation of a fuel additive and treating fuel in a manner consistent with certain example embodiments of the present invention.

Reference throughout this document to "one embodiment", "certain example embodiments", "examples", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "a" or "an" or "the", as used herein, are defined as one or more than one.

The term "plurality" and "multiple", as used herein, is defined as two or more than two.

The term "another", as used herein, is defined as at least a second or more.

The use of numerical adjectives such as "first", "second", "third", etc., is generally intended as merely a label of convenience to enable ease of reference to a particular item or act without any implication of an order or hierarchy unless specifically stated otherwise.

The terms "including" and/or "having" and/or "has", as used herein, are defined as comprising (i.e., open language).

The verb "is" should be considered open ended language that refers to an example, such that the term "A is a B" means that A is an example of something that can be used as B.

The term "coupled", as used herein, is defined as connected, although not necessarily directly, and not necessarily mechanically.

For purposes of this document, the prefix "nano" as used, for example in "nanoparticle" is intended to refer to particles having length in at least one dimension in the range of approximately 1-100 nanometers. However, in some particular cases, the length scale for achieving the novel properties and phenomena consistent with certain example embodiments of the present invention may be less than 1 nanometer or be slightly larger than 100 nanometers. As used herein "nanoparticle" may refer to a particle or an agglomerate of smaller primary particles.

The term "dispersion stabilizer" as used herein is defined as one or more dispersants or surfactants or other ingredients used alone or in combination to produce a stable dispersion of particles in a fuel. The term "dispersion stabilizer" is to be considered both singular and plural in that, for example, a dispersion stabilizer can be made up of a first surfactant and a second surfactant, or a surfactant and a dispersant, each of which may individually be considered a dispersion stabilizer. The use of multiple components which are individually considered a dispersion stabilizer results in the combination of components also being considered a dispersion stabilizer.

The term "nanopolishing" as used herein means polishing using nanoparticles.

The term "nanodiamond" or (ND) refers to diamond particles with sizes in the nano range. The term "nanodiamond" is broadly used for a variety of diamond-based materials at the nanoscale including pure-phase diamond films, diamond particles and their structural assemblies.

The term "detonation nanodiamond" or (DND) refers to a nanodiamond (ND) particle that originates from a detonation, and is sometimes also referred to as "ultradispersed diamond (UDD)".

The term "HPHT nanodiamond" refers to a nanodiamond particle that was produced by grinding microdiamond powders manufactured by static high-pressure, high-temperature (HPHT) synthesis, e.g., by use of special presses.

Ranges described herein include any sub-range within the range recited. Recitation of ranges of values herein are merely intended to serve as a shorthand method of referring individually to each separate value falling within the range, unless otherwise indicated herein, and each separate value is incorporated into the specification as if it were individually recited herein. Recitation of ranges of values herein are merely intended to serve as a shorthand method of referring individually to each separate value falling within the range, unless otherwise indicated herein, and each separate value is incorporated into the specification as if it were individually recited herein. The word "about", "approximately" or "around" when accompanying a numerical value, is to be construed as indicating that minor deviations in value are permitted, for example, a deviation of up to and inclusive of 20% from the stated numerical value.

The term "fully formulated fuel" as used herein means energy source for engines and mechanisms containing different types of additives improving its performance (removal of water, detergents, cleaning fuel systems and improvement in engine wear and fuel efficiency). Fully formulated fuel is a fuel such as gasoline or diesel, distributed by a gas or diesel stations. A non-exhaustive list of examples of fully formulated fuels can be found in the list of registered fuels which is provided at the U.S. government's EPA web site.

The term "fully formulated oil" as used herein means an oil lubricant containing additives that enhance the performance of the oil, for example by reducing friction, increasing the ability to withstand heat, detergents, etc.

The term "base fuel" as used herein means a fuel that was used in order to disperse nanocarbon particles, as a "dispersion media". Base fuel containing nanocarbon particles is intended to be added to the final fuel (e.g., gasoline, diesel fuel, two stroke engine fuel, etc.) that is used in combustion engines and mechanisms for improvement of its performance. Different types of hydrocarbons can be used as a base fuel, for example kerosene, diesel fuel, and gasoline (including fully formulated fuels). Alcohols such as butanol and/or ethanol can be used as a base fuel. Additionally, other liquid fuels, kerosene, gasoline, diesel fuel, marine fuel, avionic fuel, organic combustible liquid, petroleum, liquid petroleum, gas, coal tar, biofuel, biodiesel fuel, phenols, polycyclic aromatic hydrocarbons, heterocyclic hydrocarbon compounds, renewable fuel, benzene, toluene, xylene, aromatic oils, polybutenes, polyglycols, naphtha, naphthalene, fuel oil, and fuel mixtures, naphtha can also be used as a base fuel. Base fuel as used herein can include mineral oil, synthetic oils, semi-synthetic oils, semi-synthetic severely hydro cracked oil, plant based oils and fully formulated oils.

The term semisynthetic engine oil means a blend of synthetic basestock and conventional mineral oil(s).

The term "1-dimensional based material" as used herein means material where its size in one dimension prevails (aspect ratio more than about 5), for example carbon nanotubes.

The term "2-dimensional based material" as used herein means material where its sizes in two dimension prevail (aspect ratio more than about 5), for example graphene flakes or platelets.

The term "nano-fuel" as used herein means fuel containing nanoparticles.

The term "nano-additive" as used herein means additive containing nanoparticles.

The term "zeta potential" as applied to diamond particles in the absence of any reference to a suspension herein means the zeta potential of a suspension of the particles in deionized water.

The use of any and all examples, or language indicating a example ("e.g." or "such as" or "for example") provided herein, is intended merely to better illuminate the invention and does not pose a limitation on the scope of the invention unless otherwise explicitly claimed. No language in the specification should be construed as indicating any non-claimed element as essential to the practice of the invention.

DETAILED DESCRIPTION

While this invention is susceptible of embodiment in many different forms, there is shown in the drawings and will be herein described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

Nanodiamond (ND) particles are used as a unique fuel additive in accord with the teaching herein. The anticipated benefits encompass those sought for many fuel additives but with potentially better engine performance and fuel economy as well as reduced wear and friction without the drawbacks of increased oxide particle emissions and risk of spontaneous ignition.

Improved fuel efficiency is an overriding motivation with potentially as much as about 5-15% improvement expected. Addition of ND to improve vehicle fuel efficiency is applicable to combustion engines which utilize gasoline, diesel fuel, biodiesel, kerosene, JP8 and other liquid fuels as well as fuel mixtures such as, for example, gasoline mixed with ethanol, mixtures of gasoline and oil (i.e. two stroke engine fuel) or mixtures of fuel with oil as used in any type of engine utilizing such mixture as fuel. Diesel engines are generally more efficient than spark ignition engines, however, emissions from diesel engines are typically substantially higher. Reduction of emissions of unburnt hydrocarbon emission (soot), carbon monoxide, and nitrous oxide by as much as about 50% or better is expected from the use of a nanodiamond-based additive according to the present teachings. For oil/gasoline powered two stroke engines, the gasoline to oil mixture ratio may range from approximately 10:1 to 100:1.

The level of improvement is dependent upon the nature of the ND particle, particle size, surface area, the concentration, the catalytic activity, surface functionalization and impurity content. In contrast to metals, metal oxide or oxyhydroxide nanoparticle-based additives, which result in the release of metal oxides into the environment (which is an environmental concern), the use of nanodiamond or functionalized or modified nanodiamond produce few if any solid oxide emissions.

Selected solid nanoparticles incorporated into both liquid and solid hydrocarbon-based fuels add significantly to the energy density. Materials such as Al, B, Be and Si have greater than or equal to two times the volumetric energy density of common hydrocarbon-based fuels. While not intending to be bound by current theory, addition of nanoparticles to fuels may influence fuel combustion in a number of ways. The presence of the nanoparticles may lower the rate of combustion following ignition thus lowering the peak pressure and temperature in the cylinder and subsequently reducing $NO_x$ emissions. Combustion may be prolonged due to the difference in the ignition temperature of the fuel and nanoparticles reducing unburnt hydrocarbons and emission of soot and carbon monoxide. More efficient combustion results in improved fuel efficiency and reduced build-up of soot deposits within the cylinder and exhaust valves. Nano-additives release energy during combustion, in addition to the energy release of the fuel thus increasing the total energy release. Improved energy efficiency results from not only more efficient combustion but also the increased energy density of the liquid or solid hydrocarbon-based fuels containing higher energy density nanoparticles.

In accord with experiments conducted, nanodiamond may have significant advantages relative to other additives. Bulk diamond already has among the highest energy densities by weight and volume of any material. As a result, nanodiamonds produced by crushing bulk diamond, by high pressure-high temperature (HPHT) synthesis, by shock wave synthesis or other mechanisms of synthesis have high energy density in terms of weight and volume and are attractive as nanoparticle additives. Nanodiamond produced by detonation of explosives, referred to as detonation nanodiamond (DND), in a highly non-equilibrium process results in a material containing high density of dislocations and multiple twins and grain boundary defects. These defects result in additional excess energy that is stored in the detonation ND particles. Additionally, DND particles are relatively inexpensive.

The reported measured enthalpy of formation of DND is much higher than that for bulk diamond. Additional stored energy is associated with the surface reconstruction of bare ND to a fullerene-like structure (buckydiamond) resulting in compression of the diamond core producing an estimated internal pressure of about 50 GPa. These three potential mechanisms to store energy are only believed possible for crystalline solids such as ND which have a high energy density core which also contains dislocations and defects and/or which undergoes surface reconstruction to produce lattice compression.

Additionally, ND can be functionalized so that it has no surface oxide, as Al particles do. Surface oxides on particles such as Al, for example, reduce the overall energy density and should be disrupted before the Al core can participate in the combustion process. The possibility for the absence of a surface oxide also allows one to reduce the particle size without the oxide being an increasing fraction of the overall particle volume. Yet, the large surface area and porosity of DND results in high adsorption of $O_2$ which contributes to combustion.

Alternatively ND can be functionalized with oxygen containing groups to increase the oxygen available for the combustion process. The primary particle size of a typical DND is approximately 4-5 nm which is well below that typical of materials which form a surface oxide. The percentage of surface atoms increases rapidly as the particle size is reduced and these surface atoms possess a greater amount of energy.

Diamond is stable in air and in fuels in contact with air. It does not oxidize until the temperature is raised above about 450° C., thus it does not pose a significant risk of spontaneous ignition. Although being carbon, certain ND can be readily functionalized with a variety of surface groups or organic molecules to further increase the energy density or reactivity. This can include surface groups such as alkanes, azido-alkanes, or diazido-alkanes. Surface functionalization and use of a suitable dispersion stabilizer such as a surfactant or dispersant allows one to form stable suspensions in fuels. DND is produced using a scalable high volume production process. Nanodiamonds used as a nanofuel additive can be produced by different processes including, but not limited to synthesis using explosives, laser-based synthesis, static high-pressure high-temperature synthesis and other known methods. Nanodiamonds used as a nanofuel additive can be primary completely de-aggregated particles (for example, about 3-6 nm primary particles of detonation NDs), or aggregates of primary particles.

Another expected benefit from using ND in fuels comes from its ability to reduce friction and wear of moving surfaces in contact, when the contact is wetted with a liquid containing NDs. The nanopolishing effect of surfaces due to the presence of NDs can be also achieved in a hydrodynamic regime, when a fluid containing NDs moves relative to a surface. More polished surfaces with lower friction and wear within systems and mechanisms participating in a fuel combustion process contribute to higher fuel efficiency. Nanodiamond additives in fuels can be used in combination with other additives increasing fuel efficiency including other types of nanoparticles (metals, metal oxides, nanographite, carbon nanotubes, graphene, graphene nanoplatelets, graphene oxide and others) so that a potentially synergistic effect from using different additives can take place. In the majority of examples of the present invention, different types of dispersion stabilizers (dispersants and\or surfactants, etc.) were used to produce stable suspensions of NDs in fuels.

Examples of surfactant type dispersion stabilizer used in preparation of ND suspensions in fuels include zwitterionic surfactants, non-ionic surfactants, ionic surfactants, cationic surfactants, anionic surfactants. The amount of surfactant can vary between about 0.1 to 10 parts of surfactant per 1 part of ND by weight. Examples of functionalization of NDs for preparation of ND dispersions in fuels include hydrogenation, fluorination, reduction, oxidation and other reactions. Nanodiamonds used in fuel additives can have negative or positive zeta potentials.

Nanodiamond-based additives can be used in different types of fuel including but not limited to gasoline, kerosene, diesel, marine fuels, avionic fuels, alcohols, benzene, toluene, xylene, hydrocarbons, aromatic oils, polycyclic aromatic compounds, heterocyclic hydrocarbon compounds, phenols, polybutenes, polyglycols, naptha, naphthalene, biofuel, biodiesel, organic fuels, petroleum, liquid petroleum gas, coal tar, renewable fuels and fuel mixtures to improve fuel efficiency and combustion engine performance and reduce emissions.

Colloidal nanocarbon particles are nanocarbon particles suspended in a liquid. In the present application, the liquid used for suspending the nanocarbon particles can be water, butanol or a mixture thereof, but this is not to be considered limiting. A colloidal suspension of nanocarbon particles (colloidal nanocarbon particles) can be produced, for example, using techniques similar to those used in U.S. Pat. No. 7,569,205 to Hens, et al. filed Sep. 7, 2007 and entitled "Nanodiamond Fractionization and Products Thereof", which is hereby incorporated by reference. In order to produce colloidal nanocarbon particles as used in a manner consistent with the present teachings, water or butanol or a combination of water and butanol is used as a solvent. Nanocarbon particle powder such as nanodiamond nanoparticle powder of the desired size and makeup are poured into the solvent and sonicated for up to about 30 minutes using an immersion horn sonicator (e.g., Hielsher 1000HD). The resulting suspension is used as the colloidal nanocarbon particles discussed herein.

Hence, a nanodiamond-based fuel additive can include: a base fuel, colloidal nanocarbon particles, where the colloidal nanocarbon particles include at least one type of the following types of particle: nanodiamonds, functionalized nanodiamonds, polycrystalline nanodiamonds, nanodiamonds surrounded by a $sp^2$ carbon shell, buckydiamond, carbon onions, carbon onions containing a nanodiamond core, and detonation soot; and may contain one or more dispersion stabilizers (e.g., surfactants or dispersants) for dispersion of the carbon particles in the base fuel.

Another embodiment includes a fuel additive having: a base fuel, colloidal nanocarbon particles, where the colloidal nanocarbon particles make up at least one type of particle selected from: functionalized nanodiamonds, functionalized buckydiamond, functionalized carbon onions, functionalized carbon onions containing a nanodiamond core, and functionalized detonation soot where functionalization is performed in order to improve the dispersivity of the nanocarbon particles in the base fuel. The colloidal nanocarbon particles can be combined with 1-dimensional and 2-dimensional nanocarbon based materials, such as carbon nanotubes, graphene, oxidized graphene, graphite nanoplatelets, oxidized graphite nanoplatelets and similar carbon-based nanomaterials.

Another embodiment includes a fuel additive having: a base fuel, colloidal nanocarbon particles, where the colloidal nanocarbon particles make up at least one type of particle selected from: 1-dimensional and 2-dimensional nanocarbon based materials, such as carbon nanotubes, graphene, oxidized graphene, graphite nanoplatelets, oxidized graphite nanoplatelets and similar carbon-based nanomaterials. In certain fuel additives, the base fuel has at least one fuel selected from liquid fuel, fossil fuel, hydrocarbon fuel, alcohol fuel, ethanol, kerosene, gasoline, diesel, biodiesel, and other types of liquid fuel or fuel mixtures. In certain fuel additives containing carbon nanoparticles can be added to at least one type of fully formulated fuel selected from liquid fuel, fossil fuel, hydrocarbon fuel, alcohol fuel, ethanol, kerosene, gasoline, diesel, biodiesel, and other types of liquid fuel or fuel mixture. Addition of the fuel additive containing carbon nanoparticles including nanodiamonds to the fully formulated fuel can be used for many industrial applications, including fueling generators, compressors and other applications, and transportation applications, including automotive, aircraft and ship or marine applications. Such use is aimed at enhancing the fuel performance and reducing emissions and minimizing engine wear.

The base fuel of the fuel additive may be, for example, mineral oil, a synthetic oil, a semi-synthetic oil, a semi-synthetic severely hydro cracked oil, and a fully formulated oil.

In certain fuel additives consistent with the present discussion, the nanocarbon particles are modified by a modification selected from a wet phase chemical reaction, gas phase chemical reaction, a chemical reaction induced photochemically, a chemical reaction induced electrochemically, a chemical reaction induced mechanochemically, annealing, modification by exposure to a plasma, modification by irradiation, modification by sonic energy, a modification during a process of nanodiamond synthesis by introducing dopants or defects intended to produce nanodiamond-based fuel additive contributing to enhanced fuel performance and reduced emissions. Modifications result in nanodiamond particles having carboxylic, hydroxylic, amine, hydrogen, fluorine-containing and halogen-containing surface groups. These polar groups actively interact with the dispersants and this promotes better dispersion of NDs in the fuels. The nanocarbon material concentration in a fuel additive can vary between about $10^{-4}$ wt % and 10 wt %.

A fuel consistent with this discussion has a mixture of a fuel additive containing the carbon nanoparticles, including nanodiamonds, and a fully formulated fuel where the fuel additive makes up about $10^{-6}$ Vol % to 20 vol % in the mixture and the fully formulated fuel is one of a liquid fuel, fossil fuel, hydrocarbon fuel, alcohol fuel, ethanol, kerosene, gasoline, diesel, biodiesel, petroleum, liquid petroleum gas, and other types of liquid fuel or fuel mixture. Nanodiamond-based and other nanocarbon-based additives can be also used in solid and gaseous fuels. They can be dispersed, for example, in solid fuels by grinding and blending and in gaseous fuels using aerosols. Dispersion stabilizers can be also used in these formulations to avoid agglomeration of the nanodiamond particles.

Sizes of nanodiamond-based and other nanocarbon-based particles in the fuel additive can vary between about 1 nm and 1000 nm, but are most preferably between about 1 nm and 100 nm.

A fuel additive composition consistent with the present teachings has a base fuel, colloidal nanocarbon particles, and a dispersion stabilizer that aids in stably suspending the colloidal nanocarbon particles in the base fuel.

The colloidal nanocarbon particles may include nanodiamonds that are modified by, for example, a wet phase chemical reaction, gas phase chemical reaction, a chemical reaction induced photochemically, a chemical reaction induced electrochemically, a chemical reaction induced mechanochemically, annealing, modification by exposure to a plasma, modification by irradiation, modification by exposure to sonic energy and a modification during a process of nanodiamond synthesis by introducing dopants or defects. In addition, the colloidal nanocarbon particles can additional include carbon onions.

In the examples below the preparation of the nanodiamond-based fuel additives and their mixtures with fully formulated fuels is illustrated. The scheme shown in FIG. 1 illustrates one example approach.

In this example, the nanodiamond-based concentrate is produced in fuel-1 (up to about 5-8% of ND in the concentrate) at 10. Examples of fuel-1 include kerosene, but other types of fuel can be also used. For preparation of the concentrate solvent transfer of nanodiamonds is used as well as use of dispersion stabilizers such as various dispersants and surfactants or combinations thereof. Examples 1-6 and 10, 11, 15 below illustrate the concentrate preparation.

Next the concentrate is diluted with fuel-2 at 14 to lower the concentration of nanodiamonds (for example, to a nanodiamond concentration of about 0.1-1 wt %, but other higher or lower concentrations can be also used). An example of fuel-2 includes kerosene, but other types of fuel can be also used. This formulation, called a fuel additive is intended to be added to the final fuel that is used in combustion engines and mechanisms (fuel-3). A mixture of fuel-1 and fuel-2 make up a base fuel for the additive. Fuel-1 and fuel-2 can constitute the same type of fuel or different types of fuel.

In the final fuel, the amount of nanodiamond material can very between about 1 ppm and 10,000 ppm. Treated fuel-3 where the nanodiamond-based additive is added at 18, is a fuel that can be used in different types of fuel powered engines and mechanisms: gasoline engines, diesel engines, two stroke engines, and other types of fuel powered engines. In a similar fashion, colloidal nanocarbon particles can be prepared in the fuel additive, where the colloidal nanocarbon particles make up at least one type of particle selected from nanodiamonds, functionalized nanodiamonds, polycrystalline nanodiamonds, nanodiamonds surrounded by a $sp^2$ carbon shell, buckydiamond, carbon onions, carbon onions containing nanodiamond core, and detonation soot. The colloidal nanocarbon particles can be combined with 1-dimensional and 2-dimensional nanocarbon based materials, such as carbon nanotubes, graphene, oxidized graphene, graphite nanoplatelets, oxidized graphite nanoplatelets and similar carbon-based nanomaterials.

The fuel additive composition may also include at least one metal catalyst or metal catalyst compound such as: Mg, Ca, Ce, rare earth element, Fe, Co, Ni, Cu, Cr, Mn, Pt; or metal catalyst compound group such as metal oxide, metal carbonate, metal hydrocarbonate, metal sulfonate, metal hydroxide, metal carboxylate, nickel oleate, nickel naphthenate, nickel alkyl phenates, nickel alkyl sulfonate, nickel stearate.

One example application of the nanodiamond-based fuel additive uses the additive as an addition to aviation fuel (used for example for helicopters or unmanned aerial vehicles (UAVs)) in order to keep the aviation vehicle aloft for longer periods of time. Similar, addition of nanodiamond-based fuel additive to marine fuel increases the range of a marine vehicle, or distance it can travel without the need to refuel.

Moreover, through a combination of treating the fuel as well as the engine and transmission fluids (fuel, motor oil and transmission oil) with nanodiamond-based fuel and lubricant additives, respectively, it may be feasible to increase the overall vehicle fuel efficiency by close to 15-20% or more.

The dispersion stabilizer (e.g., dispersant or surfactant) used to produce stable suspensions of the nanocarbon particles in a fuel may include zwitterionic surfactants, non-ionic surfactants, ionic surfactants, cationic surfactants, anionic surfactants, steric surfactant. The surfactant used to produce stable suspensions of the nanocarbon particles in fuel may include surfactants with a hydrophilic-lipophilic balance of about 1 to 40, and more preferably about 1.5 to 10. The dispersant or surfactant used to produce stable suspensions of the nanocarbon particles in fuel may be one or more of cocamidopropyl betaine, sorbitan monoester, sorbitan diester, sorbitan trimester, sorbitan monostearate, sorbitan monooleate, sorbitan trioleate, glyceryl monoester, glyceryl monostearate, glyceryl monooleate, dioctylsulfosuccinate sodium salt, polymerized fatty acids, N-acyl sarcosine (for example, N-(Oleoyl)sarcosine or (Z)—N-methyl-N-(1-oxo-9-octadecenyl)glycine), polyether, imidazoline, amides, polyamides, polyalkylene amine, or combination thereof.

The dispersant (Z)—N-methyl-N-(1-oxo-9-octadecenyl)glycine) has a formula:

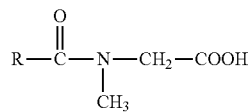

The dispersant polyether has a formula: R—O-(A-O)x-H, where R is a straight-chain or branched C6-C18-alkyl group, A is a C3- or C4-alkylene group and x is an integer from 5 to 35.

Examples of cationic surfactants include imidazoline, amides and polyamides. Imidazolines based on fatty acid include: hydroxyethyl imidazolines (based on fatty acid\aminoethylethanolamine), aminoethyl imidazolines (based on fatty acid\diethylene triamine 1:1), amidoethyl imidazolines (based on fatty acid\diethylene triamine 2:1). Examples of imidazolines include: N-b-hydroxyethyl oleyl imidazoline or 2-(2-heptadec-8-enyl-2-imidazolin-1-yl) ethanol. Another example of cationic surfactant includes olyalkylene amine (polyalkylene amine is polyisobutylene amine having a molecular weight in the range 1000 to 1500). Another dispersant combination involves a combination of polyisobutene substituted with succinic anhydride groups (having an average molecular weight of about 1000 to 5,000) and reacted with (A) a polyoxyalkylene polyamine, (e.g. polyoxypropylene diamine) and (B) a polyalkylene polyamine (e.g. polyethylene diamine and tetraethylene pentamine).

Another fuel additive composition has a base fuel and colloidal nanocarbon particles, where the colloidal nanocarbon particles include at least one type of particle such as nanodiamonds, functionalized nanodiamonds, polycrystalline nanodiamonds, single crystal nanodiamonds, aggregates of nanodiamond primary particles, nanodiamonds surrounded by a $sp^2$ carbon shell, buckydiamond, carbon onions containing a nanodiamond core, and detonation soot containing nanodiamonds; and means to stably suspend the nanocarbon particles in fuel, for example using a dispersant or surfactant to produce stable dispersions of nanocarbon particles in fuel.

In addition, the fuel additive composition may include a component aimed at further improving fuel performance such as an antifriction component, an antiwear component, a cetane improver, a lubricating component, a detergent component, a fuel catalyst component, or a combination thereof. The selected component(s) may also include at least one of metal catalyst and compounds: metal catalyst including Mg, Ca, Ce, rare earth element, Fe, Co, Ni, Cu, Cr, Mn, Pt; metal catalyst compounds comprising nickel oleate, nickel stearate, metal oxide, metal carbonite, metal hydrocarbonite, metal sulfonate, metal hydroxide, metal carboxylate or combinations thereof. The metal catalyst and metal catalyst compounds may include nanoparticles with average particle sizes from about 1 nm to 1000 nm. The component can make up from about 0.1 vol % to about 90 vol % of the additive.

Figure 2:
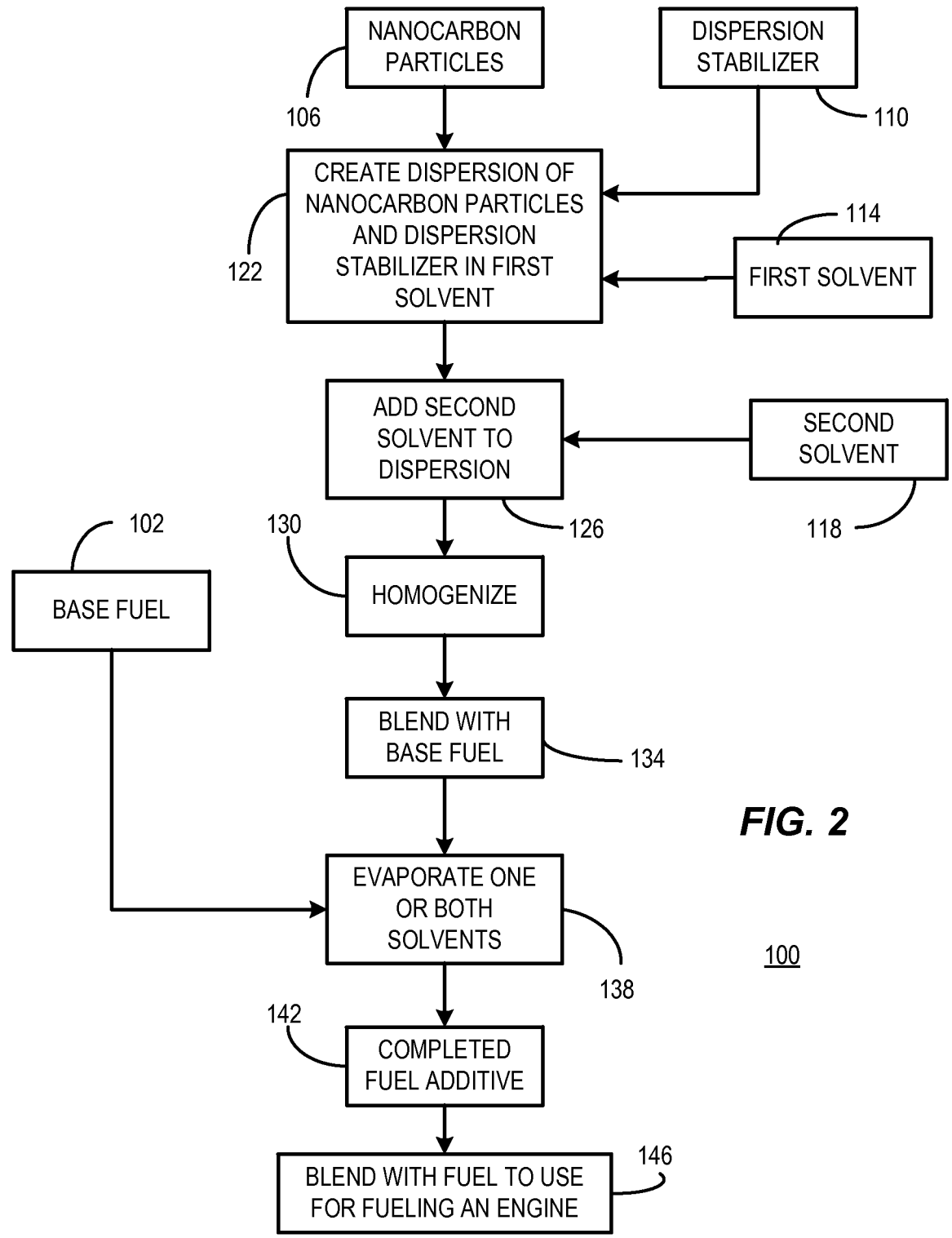
FIG. 2 is an example of a process for producing a fuel additive and use of the fuel additive in a manner consistent with certain example embodiments of the present invention.

In accord with the present teachings, a fuel additive can be made in one example by the process 100 illustrated in FIG. 2 by providing a base fuel at 102 and providing colloidal nanocarbon particles at 106. The nanocarbon particles can be, for example, at least one type of particle such as nanodiamonds, functionalized nanodiamonds, polycrystalline nanodiamonds, single crystal nanodiamonds, aggregates of nanodiamond primary particles, nanodiamonds surrounded by a $sp^2$ carbon shell, buckydiamonds, carbon onions containing a nanodiamond core, and detonation soot containing nanodiamonds. A dispersion stabilizer is provided at 110, where such dispersion stabilizer aids in stably suspending or dispersing the nanocarbon particles in the base fuel. First solvent and second solvent are provided at 114 and 118. At 122, a dispersion of the nanocarbon particles and the dispersion stabilizer-1 is created in the first solvent. The second solvent is added to the dispersion at 126. The second solvent can contain dispersion stabilizer-2. At 130, the dispersion containing the second solvent is homogenized. This homogenized dispersion is blended with the base fuel at 134 and the intermediate solvents are evaporated at 138. Although not shown in this illustration, additional base fuel can be added at this point to the evaporate and the mixture further homogenized. The fuel additive is complete at 142. This fuel additive can then be blended with fuel at 146 and used to fuel an engine (e.g., a gasoline automobile engine or lawn mower engine, a diesel engine such as a truck or generator engine, a two cycle engine such as a chain saw or weed trimmer, a rotary engine or other combustion engines). The solvents used as described above may be, for example, water, butanol, or a mixture of water with butanol in certain embodiments. In certain cases, the majority of the base fuel may be evaporated.

Figure 3:
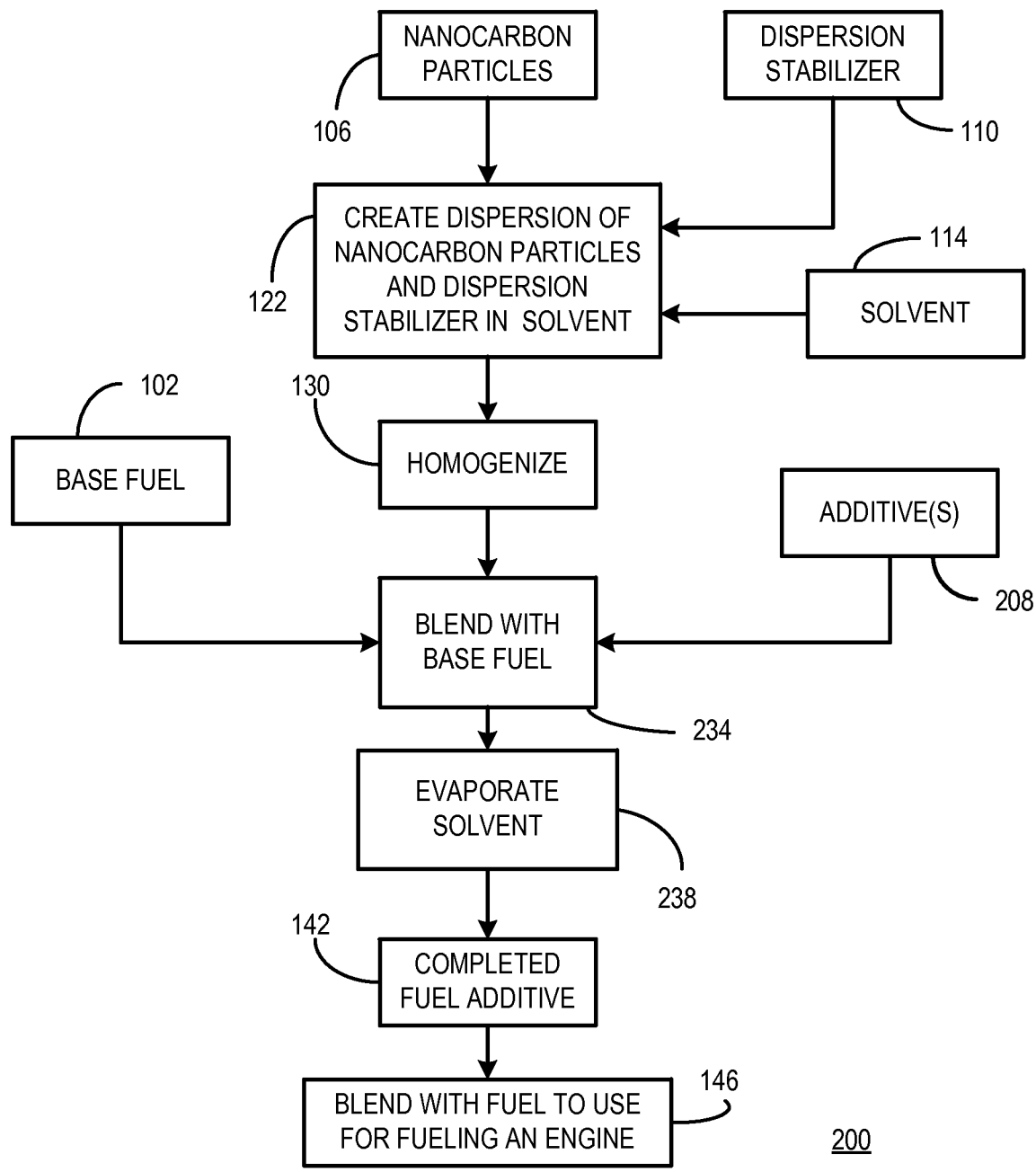
FIG. 3 is an example of a variation of the process for producing a fuel additive in which only a single solvent is used and in which other additive components are incorporated into the fuel additive in a manner consistent with certain example embodiments of the present invention.

In another example process depicted in FIG. 3, only a single solvent is used at 114 and used in 122 and 130. In this example process, additional additive(s) 208 may be incorporated into the fuel additive. The additional additive component may include one or more of an antifriction component, an antiwear component, a cetane improver component, a lubricating component, a detergent component and a fuel catalyst component. In this example, at 234, the homogenized dispersion from 130 is blended with a base fuel and additives prior to evaporation of the solvent at 238. In other embodiments, the additives can first be added to the base fuel 102, can be added to the dispersion and homogenized at 130 or added after the solvent is evaporated at 238. Other variations and combinations of the processes 100 and 200 will occur to those skilled in the art upon consideration of the present teachings.

One of the methods of production of the fuel additive using nanodiamonds, involves use of an intermediate solvent(s) to disperse the nanocarbon particles and dispersant (s), adding a second solvent, homogenization of mixtures at intermediate steps and evaporation of the intermediate solvent(s). The intermediate solvent may include, for example, water, butanol, or a mixture of water with butanol.

In each of the following examples, the Detonation Nanodiamond used is a commercially available DND. Polydispersed DND with average particle size of 150 nm and positive zeta potential was purchased from the producer New Technologies, Chelyabinsk, Russia. The DND powder was treated in air to produce DND with negative zeta potential. DND was fractionated using centrifugation to produce DND fractions with smaller sizes. DND was milled using a planetary mill and zirconia beads and then fractionated to produce a water slurry with approximately 5 nm DND particle size.

EXAMPLES

Example 1. Preparation of Nanodiamond-Based Concentrate

Detonation nanodiamond (DND) hydrosols with negative zeta potential, about 30 nm aggregate size, were used as starting material for preparation of DND suspensions in kerosene. Compositions with up to about 5 wt % of DND in kerosene in this example were prepared as a concentrate to be added to a base fuel for final formulation of a fuel additive. First, a hydrosol of DND (3-8 wt %) were mixed with an equal volume of n-butanol and with zwitterion surfactants (cocamidopropyl betaine (CAPB), aqueous solution). The mixture was homogenized using ultrasound for a period of about 20-30 minutes. Then non-ionic surfactants (sorbitan monoester: Span-60) and kerosene were added, mixed and n-butanol and water removed under vacuum using a rotor vapor. The final DND-kerosene suspension was additionally homogenized using ultrasound for about 5-10 minutes. Ultrasonication can be done either in a bath-type ultrasonicator, or by an immersion horn ultrasonicator or other mechanism. In this example, horn ultrasonication was used. Other approaches for suspension homogenization could be utilized in accordance with embodiments consistent with the present invention. The amount of zwitterion surfactants can be about 0.1-10 to 1 part of DND by weight. The amount of sorbitan monoester can be about 0.1-10 to 1 part of DND by weight.

Example 2 Preparation of Nanodiamond-Based Concentrate

DND hydrosols with negative zeta potential, about 30 nm aggregate size, were used as starting material for preparation of DND suspensions in kerosene. Compositions with up to about 5 wt % of nanodiamond in kerosene in this example were prepared as a concentrate to be added to a base fuel. First, a hydrosol of DND (3-8 wt %) were mixed with an equal volume of n-butanol and with zwitterion surfactant (cocamidopropyl betaine, aqueous solution (CAPB)). The mixture was homogenized using ultrasound for a period of about 20-30 minutes. Then non-ionic surfactants (sorbitan monoester: Span-80) and kerosene were added and n-butanol and water removed under vacuum using a rotor vapor. The final DND-kerosene suspension was additionally homogenized using horn immersed ultrasound treatment for 5-10 minutes. The amount of zwitterion surfactants can be about 0.1-10 to 1 part of DND by weight. The amount of sorbitan monoester can be about 0.1-10 to 1 part of DND by weight.

Example 3 Preparation of Nanodiamond-Based Concentrate

DND hydrosols with negative zeta potential, about 30 nm aggregate size, were used as starting material for preparation of DND suspensions in kerosene. Compositions with up to 5 wt % of DND in kerosene in this example were prepared as a concentrate to be added to a base fuel. First, a hydrosol of DND (about 3-8 wt %) was mixed with an equal volume of n-butanol and zwitterion surfactant (cocamidopropyl betaine, aqueous solution (CAPB)). The mixture was homogenized using ultrasound for a period of about 20-30 minutes. Then non-ionic surfactants (sorbitan triester: Span-85) and kerosene were added and n-butanol and water was removed under vacuum using a rotor vapor. The final DND-kerosene suspension was additionally homogenized using horn immersed ultrasound treatment for 5-10 minutes. The amount of zwitterion surfactants can be about 0.1-10 to 1 part of DND by weight. The amount of sorbitan triester can be about 0.1-10 to 1 part of DND by weight.

Cocamidopropyl betaine is a high production volume chemical represented by the CAS Nos. 61789-40-0 and 70851-07-9. One of the compositions of cosmetic grade cocamidopropyl betaine (CAS-No. 61789-40-0 and 70851-07-9) is as follows (Human and Environmental Risk Assessment on ingredients of household cleaning products, 2005):

| | |
|---|---|
| Active matter | 29.5-32.5% |
| Water | 62-66% |
| NaCl | 4.6-5.6% |
| Carbon number of alkyl chain | |
| $C_8$ | 5.6-6.0% |
| $C_{10}$ | 5.4-5.7% |
| $C_{12}$ | 53.1-53.2% |
| $C_{14}$ | 16.1-17.4% |
| $C_{16}$ | 8.1-8.3% |
| $C_{18}$ | 10.0-10.2% |

According to information provided by the manufacturers of cocamidopropyl betaine (Henkel AG & Company, KGaA, a manufacturing company making various chemical products (Düsseldorf, Germany), the composition of the technical products is as follows:

| | |
|---|---|
| Active matter | 20-38% |
| Water | <70% |
| NaCl | <10% |
| Carbon number of alkyl chain | |
| $C_8$ | <10% |
| $C_{10}$ | <10% |
| $C_{12}$ | 47-60% |
| $C_{14}$ | 17-25% |
| $C_{16}$ | 7-14% |
| $C_{18}$ | 7-14% |

As sodium chloride is one of the components in the aqueous reaction mixture handled, cocamidopropyl betaine may be described as each of the inner salt or as the respective sodium salt. The chemical structures are therefore:

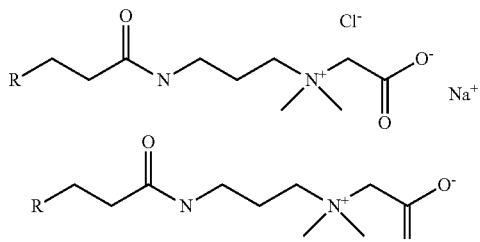

R = with varying Alkylchain lengths representing $C_8$ to $C_{18}$ fatty acids.

Sorbitan esters are marketed under the Span™ product name and are produced by the dehydration of sorbitol. Esterification with fatty acids in a controlled chemical process gives reproducible materials available from Croda Inc., 300-A Columbus Circle, Edison, N.J. 08837. A monoester of a generic Span can be represented as:

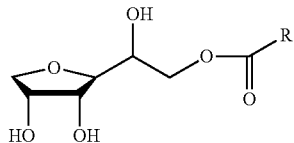

Span-60: sorbitan monostearate. HLB=4.7.
HLB: hydrophilic-lipophilic balance.
Span-80: sorbitan monooleate. HLB=4.3.

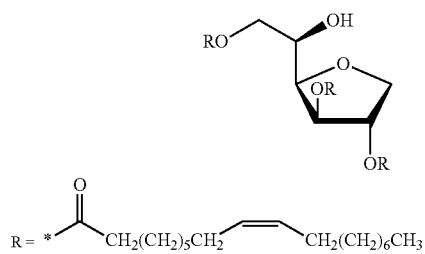

Span-85: sorbitan trioleate. HLB=1.8.

Example 4 Preparation of Nanodiamond-Based Concentrate

DND hydrosols with negative zeta potential, about 30 nm aggregate size, were used as starting material for preparation of DND suspensions in kerosene. Compositions with up to about 5 wt % of DND in kerosene in this example were prepared as a concentrate to be added to a base fuel. First, a hydrosol of DND (3-8 wt %) was mixed with an equal volume of n-butanol and with zwitterion surfactant (cocamidopropyl betaine, aqueous solution (CAPB)). The mixture was homogenized using ultrasound for a period of about 20-30 minutes. Then, non-ionic surfactants (glyceryl monoester: glyceryl monostearate (GMS)) and kerosene were added and n-butanol and water removed under vacuum using a rotor vapor. The final DND-kerosene suspension was additionally homogenized using ultrasound for 5-10 minutes. The amount of zwitterion surfactants can be about 0.1-10 to 1 part of DND by weight. The amount of glyceryl monoester can be about 0.1-10 to 1 part of DND by weight.

Example 5 Preparation of Nanodiamond-Based Concentrate

DND hydrosols with negative zeta potential, about 30 nm aggregate size were used as starting material for preparation of DND suspensions in kerosene. Compositions with up to about 5 wt % of DND in kerosene in this example were prepared as a concentrate to be added to a base fuel. First, a hydrosol of DND (3-8 wt %) was mixed with an equal volume of n-butanol and zwitterionic surfactants (cocamidopropyl betaine, aqueous solution (CAPB)). The mixture was homogenized using ultrasound for a period of about 20-30 minutes. Then non-ionic surfactants (glyceryl monoester: glyceryl monooleate (GMO)) and kerosene were added and n-butanol and water removed under vacuum using a rotor vapor. The final DND-kerosene suspension was additionally homogenized using ultrasound for about 5-10 minutes. The amount of zwitterion surfactants can be about 0.1-10 to 1 part of DND by weight. The amount of glyceryl monoester can be 0.1-10 to 1 part of DND by weight.

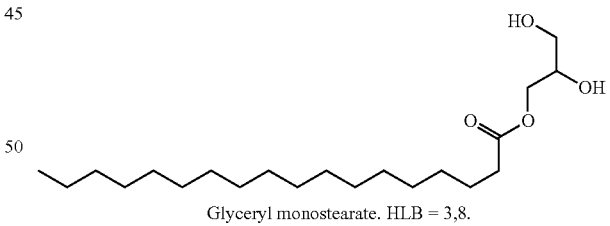

Glyceryl monostearate. HLB = 3,8.

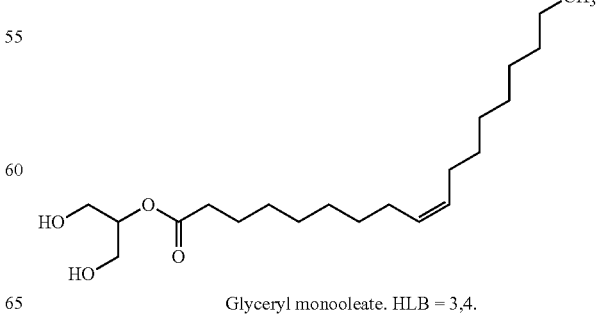

Glyceryl monooleate. HLB = 3,4.

Example 6. Preparation of Nanodiamond-Based Concentrate

DND polydispersed powder with positive zeta potential was used as the starting material for preparation of DND suspensions in kerosene. Compositions with up to 5 wt % of DND in kerosene in this example were prepared as a concentrate to be added to a base fuel. First, a polydispersed powder DND was mixed with n-butanol (3-8 wt % of nanodiamond in butanol), anionic surfactants (dioctylsulfosuccinate sodium salt (AOT)) and non-ionic surfactants (sorbitan monoester: Span-80). A zirconia mixing chamber was loaded to about 80 volume percent with $ZrO_2$ (300 um) grinding media and the dispersion of aggregated nanodiamond in n-butanol with the surfactants was sonicated for about 30 minutes at room temperature using bead assisted sonic disintegration. After sonication, the zirconia beads were separated from the suspension using a sieve. Then kerosene was added to the suspension and n-butanol and water removed under vacuum using a rotor vapor. Ultrasonication can be done either in a bath-type ultrasonicator, or using an immersion horn ultrasonicator. In the present example, tip-type ultrasonication was applied. Other approaches for suspension homogenization could be utilized in accordance with embodiments consistent with the present invention.

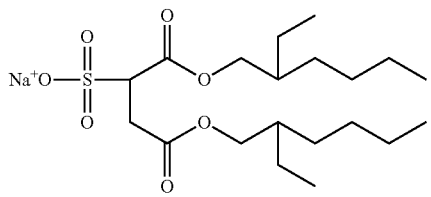

Dioctylsulfosuccinate sodium salt (Aerosol OT, AOT)

Example 7. Preparation of the Nanodiamond-Based Fuel Additive

Nanodiamond concentrate in kerosene prepared according to Example 6 at DND concentration of about 5% in kerosene and total surfactants concentration of about 5% was diluted with kerosene and mixed using a mixer so that the final concentration of DNDs in kerosene was approximately 0.5 wt %. The formulation was colloidally stable. This formulation, called DND-based fuel additive can be used as a top additive to regular fuels. Other concentrations of DND and surfactants in the fuel additive are possible, ranging, for example, from about 0.01 wt % to 5 wt %.

Example 8. Preparation of Fuel Top-Treated with Nanodiamond-Based Fuel Additive Nanodiamond-based fuel additive prepared according to Example 7 (about 2 ml of suspension of 0.5 wt % DND in kerosene) was added as a top additive to 2.7 L of fuel additive, Wynn Supremium™ Petrol produced by Wynn's Belgium B.V.B.A., Industriepark west 46, B-9100 Sint-Niklaas, Belgium, and shaken. The formulation was colloidally stable over time. The amount of nanodiamond material in the fuel additive can be in the range of about 1 ppm to 10,000 ppm.

Example 9. Preparation of the Nanodiamond-Based Fuel Additives and Fuel Top-Treated with Nanodiamond-Based Fuel Additives Nanodiamond concentrates in kerosene were prepared according to the examples 1, 3-5 with non-ionic surfactants used in the examples 1, 3-5. DND concentration in kerosene was about 5%. Then, DND concentrates were diluted with kerosene and mixed using a mixer so that the final concentration of DNDs in kerosene was about 0.5 wt %. The formulations were colloidally stable. These formulations, called DND-based fuel additives can be used as a so called "top additive" to regular fuels. Other concentrations of DND and surfactants in the fuel additive are possible, ranging, for example, from about 0.01 wt % to 5 wt %.

Prepared nanodiamond-based fuel additives were mixed with Supremium® Petrol fuel additive (1:1) and added to Lukoil-branded gasoline (LUKOIL North America, LLC., 505 Fifth Ave., 9th Floor, New York, N.Y. 10017) in a proportion corresponding to about 30 ml of 0.25 wt % ND of the fuel additive per 20 gallons of fuel (a tank of a passenger car). These fuel formulations containing nanodiamond-based fuel additive were colloidally stable over time.

Composition of W22811—Supremium® Petrol additive produced by Wynn's Belgium B.V.B.A. (as taken from the MSDS) contains:

| INFORMATION ON INGREDIENTS | | | |
|---|---|---|---|
| NAME | CAS NO | EINECS/ELINCS | MIN/MAX. |
| (Z)-N-methyl-N-(1-oxo-9-octadecenyl)glycine | 110-25-8 | 203-749-3 | 0.5 < C < 1% |
| 2-(2-heptadec-8-enyl-2-imidazolin-1-yl)ethanol | 95-38-5 | 202-414-9 | 0.5 < C < 1% |
| Polyalkylene amine | Polymer | Polymer | 25 < C < 50% |
| Polyether | 173140-85-7 | Polymer | 10 < C < 15% |
| Solvent naphtha (petroleum), heavy arom.; Kerosine - unspecified | 64742-94-5 | 265-198-5 | 5 < C < 10% |
| hydrocarbons, C11-C14, n-alkanes, isoalkanes, cyclics, aromatics (2-25%) | 64742-81-0 EX | 925-653-7 | 25 < C < 50% |
| naphthalene | 91-20-3 | 202-049-5 | 0.5 < C < 1% |

Example 10. Preparation of the Nanodiamond-Based Fuel Additive and a Fuel Top-Treated with Nanodiamond-Based Fuel Additive Commercial detonation nanodiamond powder was dispersed in water by sonication and fractionated by centrifugation for about 30 minutes at about 20,000 g forces. The supernatant contained a fraction of DND with an average aggregate size of about 30 nm. Water was evaporated from the supernatant. The powder obtained was treated in a flow of hydrogen at about 400° C. for 5 days. The resultant hydrogenated DND powder was dispersed using ultrasound in methanol, isopropanol and ethanol in an amount of about 1-2 wt % and formed stable suspensions. The DND suspension in ethanol diluted to about 0.5 wt % of NDs was used as a fuel additive. The DND suspension in ethanol was added to commercially available regular unleaded gasoline obtained from a Han-Dee Hugo™ store (fully formulated fuel), so that the DND concentration in the gasoline was about 0.001 wt %. The suspension was stable over time.

Example 11. Preparation of the Nanodiamond-Based Fuel Additive Using Fluorine-Containing Dispersant A fluorine-containing dispersant was used for preparation of the fuel additive containing NDs. The fluorine-containing dispersant was obtained by a reaction involving monoester or diester of alkyl- or alkenylsuccinic acid and a polyfluorinated alcohol as described in U.S. Patent Application serial number 2012/0122743 to Shenderova filed Jul. 23, 2010 which is hereby incorporated by reference. Surprisingly, this dispersant worked in fuels as well as in lubricants. ND particles were milled to produce fully disaggregated primary particles of about 5 nm when dispersed in water. Powder of the approximately 5 nm ND particles was dispersed in butanol by sonication (50 mg/ml). Then the ND dispersion in butanol was mixed with an equal volume of kerosene and sonicated. Then the butanol was evaporated using a rotor-vapor and the fluorine-containing dispersant dispersed in kerosene mixed with the ND suspension in kerosene. A stable transparent suspension of ND in kerosene was formed. The amount of dispersant can vary between approximately 2 to 20 by weight relative to weight of NDs. The final preparation of ND in kerosene was about 1 wt % (and about 7 wt % of the dispersant).

Example 12. Preparation of Diesel Fuel Mixed with Nanodiamond-Based Fuel Additive Containing Fluorine-Containing Dispersant The preparation of ND in kerosene produced in Example 11 was mixed with diesel fuel (in the proportions from 1:10,000 to 100:1). The ND in kerosene and diesel fuel were completely miscible at all ratios and formed stable suspensions. Compositions with 0.003 wt % and 0.01 wt % of ND in diesel fuel were prepared and tested using a tribometer.

Block-on-ring tests (using UMT-3 tribometer, USA) were conducted at a 10 kg and 30 kg load and 200 rpm rotation velocity. Duration of the tests was up to 5 hours. Coefficient of friction (COF) for pure diesel was 0.16 and did not change throughout the duration of the tests. COFs for the diesel fuel containing NDs were decreased by about 19% to 0.13 and were constant over the test. The wear scar in tests of diesel fuel containing NDs were measured to be approximately 10% smaller than the wear scar obtained in experiments with pure diesel fuel, clearly indicating a reduction in wear and friction. These results indicate that addition of NDs into fuel is beneficial due to reduction of friction that can result in increased fuel efficiency as well as reduction in wear that might result in improved engine longevity.

In another experiment, a commercial gas treatment additive called STP® brand gas treatment produced by Armored Autogroup Inc, 44 Old Ridgebury Road, Suite 300, Danbury, Conn. 06810, containing alkylphenol polyoxyalkyl alkylamine and polyolefin alkyl phenol alkyl amine was used as a further additive to the ND-based fuel additive. After adding 10 vol % of STP® brand additive to 1% of ND in kerosene and then adding this formulation 1:100 to diesel fuel, a stable transparent formulation was obtained. This formulation also demonstrated decreased COF (by approximately 20%) and wear (by approximately 10%) in tribo tests in comparison with experiments with pure diesel fuel.

Example 13. Preparation of Gasoline Mixed with Nanodiamond-Based Fuel Additive Containing Fluorine-Containing Dispersant The preparation of 1 wt % of ND in kerosene produced in Example 11 was mixed with gasoline (in the proportions from about 1:10,000 to 100:1). The ND in kerosene and gasoline were completely miscible at all ratios and formed stable suspensions. Compositions with about 0.003 wt % and 0.01 wt % of ND in gasoline were prepared.

In another experiment, STP brand commercial gas treatment additive containing alkylphenol polyoxyalkyl alkylamine and polyolefin alkyl phenol alkyl amine was used as a further additive to the ND-based fuel additive. After addition of about 20 vol % of STP brand additive to 1 wt. of ND in kerosene and then adding this formulation at a ratio of about 1:300 to gasoline, a stable transparent formulation was obtained.

In another experiment, Ni stearate was used as an additive to the ND-based fuel additive. After addition of about 1 vol % Ni stearate to 1 wt. % of ND in kerosene and then adding this formulation at a ratio of about 1:300 to gasoline, a stable transparent formulation was obtained.

In another experiment, Ni oleate was used as an additive to the ND-based fuel additive. After dissolving about 1 wt % of Ni oleate in hexane, 1 vol % of Ni oleate in hexane was added to about 1 wt. % of ND in kerosene and then this formulation was added at a dilution of about 1:100 to gasoline; a stable transparent formulation was obtained.

Example 14. Preparation of Gasoline or Diesel Fuel Mixed with Fluorine-Containing Dispersant Containing NDs The preparation of about 1 wt % of ND in kerosene produced in Example 11 was heated at 180° C. while stirring until the kerosene was evaporated. The formulation did not change weight upon longer heating. In this fuel additive the majority of the base fuel has been evaporated. A formulation of well dispersed NDs in the fluorine-containing dispersant was obtained. It was viscous. This formulation can be used in order to obtain stable formulation of NDs in different fuels. The formulation was added to kerosene, gasoline and diesel so that the amount of NDs in the final formulations was about 1 wt %. All suspensions were stable.

Example 15. Preparation of the Nanodiamond-Based Fuel Additive Using Fluorine-Containing Dispersant and Oil A fluorine-containing dispersant was used for preparation of the fuel additive containing NDs in polyalphaolefin (PAO) oil. The fluorine-containing dispersant was obtained by a reaction involving monoester or diester of alkyl- or alkenylsuccinic acid and a polyfluorinated alcohol. ND particles were milled to fully disaggregated 5 nm primary particles when dispersed in water. Then the dispersion of about 5 nm ND particles in water was dispersed in 2-butoxyethanol by sonication (50 mg/ml). Water was evaporated using a rotor-vapor. Then ND dispersion in 2-butoxyethanol was mixed with an equal volume of PAO oil and sonicated. Then the 2-butoxyethanol was evaporated using a rotor-vapor and the fluorine-containing dispersant dispersed in PAO oil mixed with the ND suspension in PAO oil. A stable transparent suspension of ND in PAO oil was formed. The amount of dispersant can vary between approximately 2 to 20 by weight relative to weight of the NDs. The final preparation of ND in PAO oil was about 1 wt % (and 10 wt % of the dispersant). 1 wt % of ND in PAO was mixed with diesel fuel in ratios from 1:100 to 3:1. All preparations were stable.

1 wt % of ND in PAO was mixed with kerosene in ratios from 1:100 to 3:1. All preparations were stable.

1 wt % of ND in PAO was mixed with gasoline in ratios from 1:100 to 3:1. Preparations with ratios ND in PAO to gasoline exceeding approximately 1:10 were less stable than preparations at lower dilutions.

Example 16. Field Experiments with the Nanodiamond-Based Additive

In this series of experiments, real life tests on the influence of the additives consistent with the present teachings mixed with gasoline on the gasoline consumption were performed. Fuel additive was prepared as in Example 11 and was added to an automobile's gasoline and fuel efficiency was measured. The additive was about 1 wt % of 5 nm DND dispersed in kerosene using fluorine-containing dispersant (7 wt %). A Ford Focus, 2009 was used in experiments. In the experiment, a base line was established first based on 10 consequent gas fillings. Then oil was changed and motor oil additive was added. After a base line was established with the motor oil additive (based on 3 consequent gas fillings), gasoline additive was added and fuel consumption measured (based on 3 consequent gas fillings). Before the oil change, the car had an average gasoline consumption efficiency of 31.34±0.31 miles per gallon. After oil change (5W30 Exxon Mobil Superflow™ oil was used), 120 ml of PAO-based additive (1 wt % DND and 10 wt % of fluorine containing dispersant in PAO oil) was added to 4 quarts of the motor oil. On average, improvement in fuel efficiency was 2.29% (32.09±0.21 mpg).

Then 100 ml of ND-based additive (1 wt % DND and 7 wt % of fluorine containing dispersant in kerosine) was added to the fuel tank. The additive was added before the gasoline was used for filling the tank. Approximately 11 gallons of gasoline were used in each filling (total 3 filling). In every one of the three filling 100 ml of the additive was added. On average, improvement in the total fuel efficiency after adding of the fuel additive became 5.4% (33.06±0.12 mpg). Driving conditions were very consistent during the tests. Small standard deviations in every test demonstrate consistency in fuel efficiency improvement that originated from ND-based additive to the motor oil and then the ND-based fuel additive. The amount of the fuel additive introduced to the fuel can be further optimized by experimentation. In this test it was clearly demonstrated that the above ND-based additive to gasoline provides improvement in fuel efficiency.

Example 17. Experiments with the Nanodiamond-Based Additive in Improved Fuel Efficiency (FE)

An independent test laboratory was commissioned to evaluate the ability of nanodiamond-based fuel additive to improve fuel economy in 2.0 L Mazda 4-cycle gasoline powered automobile engine. Fuel additive was prepared as in Example 11 and was added to gasoline (between 1:700 and 1:200 volume ratios) and fuel efficiency was measured. The additive was 1 wt % of 5 nm DND dispersed in kerosene using fluorine-containing dispersant (about 7 wt %). The test run used approximately 30 gallons in order to reach a conclusive reliable result. The testing procedure used repetitive stationary and mobile testing sequences. Both industry standard test procedures as well as the Laboratory's unique protocols to achieve the most accurate results were used, including both the injection pattern test and emissions monitoring (deposit formation, injector interface).

First a baseline fuel usage was established. "Baseline" included FE protocol, combustion analysis, injector spray pattern, emissions measurement, oil temperatures, cylinder head temperature, power/torque (HP/TQ) and coolant temperature. The baselines have resulted from numerous and varied test sequences. After addition of the nanodiamond-based additive, observed FE improvement was outside the "window of error" in most of the test sequences. No any negative engine functions were observed. This testing is ongoing as of this writing.

The standard ways of improving FE using gasoline fuel additives include using of detergents cleaning the parts of the engine, through using a combustion improver (better fuel atomization), or by friction reduction. In the case of the friction reduction the intake valves, upper cylinder area and ring area may experience reduced friction post combustion.

Thus, a fuel additive composition consistent with the present teachings has a base fuel a colloidal nanocarbon particles, where the colloidal nanocarbon particles include colloidal nanodiamond particles; and a dispersion stabilizer that aids in stably suspending the colloidal nanodiamond particles in the base fuel.

The colloidal nanodiamond particles can include at least one type of particle selected from: nanodiamonds, functionalized nanodiamonds, polycrystalline nanodiamonds, single crystal nanodiamonds, aggregates of nanodiamond primary particles, nanodiamonds surrounded by a $sp^2$ carbon shell, buckydiamonds, carbon onions containing a nanodiamond core, and detonation soot containing nanodiamonds. The colloidal nanocarbon particles can further include carbon onions.

In certain example implementations, the base fuel can be at least one of: liquid fuel, kerosene, gasoline, diesel fuel, marine fuel, avionic fuel, organic combustible liquid, alcohol fuel, hydrocarbon fuel, petroleum, liquid petroleum gas, coal tar, biofuel, biodiesel, phenols, polycyclic aromatic hydrocarbons, heterocyclic hydrocarbon compounds, renewable fuel, benzene, toluene, xylene, polybutenes, polyglycols, naphtha, fuel oil, naphthalene and fuel mixtures. In certain example implementations, the base fuel can be at least one of kerosene, gasoline, oil fuel mixtures such as two stroke engine fuel, diesel fuel, naphtha and ethanol. In certain example implementations, the base fuel can be at least one of mineral oil, a synthetic oil, a semi-synthetic oil, a semi-synthetic severely hydro cracked oil, and a fully formulated oil.

In certain example implementations, the colloidal nanocarbon particles can include nanodiamonds that are modified by one or more of a wet phase chemical reaction, gas phase chemical reaction, a chemical reaction induced photochemically, a chemical reaction induced electrochemically, a chemical reaction induced mechanochemically, annealing, modification by exposure to a plasma, modification by irradiation, modification by exposure to sonic energy and a modification during a process of nanodiamond synthesis by introducing dopants or defects.

In certain example implementations, the nanodiamonds may contain at least one of: nanodiamond including carboxylic, hydroxylic, amine, hydrogen, fluorine-containing and halogen-containing surface groups.

In certain example implementations, the dispersion stabilizer can be at least one surfactant such as zwitterionic surfactants, non-ionic surfactants, ionic surfactants, cationic surfactants, anionic surfactants and steric surfactants. In certain example embodiments the surfactant includes at least one of the following surfactants: cocamidopropyl betaine, sorbitan monoester, sorbitan diester, sorbitan trimester, sorbitan monostearate, sorbitan monooleate, sorbitan trioleate, glyceryl monoester, glyceryl monostearate, glyceryl monooleate, dioctylsulfosuccinate sodium salt, polyolefin alkyl phenol alkyl amine, polymerized fatty acids, N-acyl sarcosine, polyether, imidazoline, amides, polyamides and polyalkylene amine. In certain example implementations, the dispersion stabilizer can include a fluorine containing oligomeric dispersant. In certain example implementations, the fluorine containing oligomeric dispersant can be at least one dispersant from the following: a fluorine-containing monoester of alkylsuccinic acid, isomers of fluorine-containing monoester of alkylsuccinic acid and a fluorine-containing diester of alkylsuccinic acid.

In certain of the implementations, the base fuel can be a solid fuel or a gaseous fuel. In certain example implementations, the colloidal nanocarbon particle concentration in the fuel additive is between approximately 0.0001 wt % and 10 wt %. In certain example implementations, the colloidal nanocarbon particles are further combined with 1-dimensional or 2-dimensional nanocarbon-based materials. In certain example implementations, the nanocarbon-based materials can be one or more of: carbon nanotubes, graphene, oxidized graphene, graphite nanoplatelets and oxidized graphite nanoplatelets. In certain example implementations, the colloidal nanocarbon particles are combined with metal nanoparticles and metal oxide nanoparticles. In certain example implementations, the dispersion stabilizer includes a surfactant with a hydrophilic-lipophilic balance of approximately 1 to 40 In certain example implementations, the fuel additive composition further includes at least one of the following components: an antifriction component, an antiwear component, a cetane improver component, a lubricating component, a detergent component and a fuel catalyst component. In certain example implementations, one or more of the nanocarbon-based materials are selected from: carbon nanotubes, graphene, oxidized graphene, graphite nanoplatelets and oxidized graphite nanoplatelets. In certain example implementations, the fuel additive composition also includes at least one metal catalyst or metal catalyst compound such as: Mg, Ca, Ce, rare earth element, Fe, Co, Ni, Cu, Cr, Mn, Pt; or metal catalyst compound group such as metal oxide, metal carbonate, metal hydrocarbonate, metal sulfonate, metal hydroxide, metal carboxylate, nickel oleate, nickel naphthenate, nickel alkyl phenates, nickel alkyl sulfonate, nickel stearate. In certain example implementations, the metal catalyst or metal catalyst compound includes nanoparticles with average particle sizes from about 1 nm to 1000 nm. In certain example implementations, the component is approximately 0.1 vol % to 90 vol % of the additive.

In certain example implementations, the base fuel can be a mixture of at least one of: Kerosene, gasoline, diesel fuel, naptha and ethanol; and at least one of: mineral oil, castor oil, a synthetic oil, a semi-synthetic oil, a semi-synthetic severely hydro cracked oil, and a fully formulated oil where the fuel to fluid ratio ranges from about 10:1 to about 100:1. In certain embodiments, the majority of the base fuel is evaporated.

An example method of reducing fuel consumption of an internal combustion engine consistent with the present teachings involves providing fuel for the internal combustion engine; mixing a fuel additive composition to the fuel. The fuel additive includes: a base fuel; colloidal nanocarbon particles, where the colloidal nanocarbon particles include at least one of the following types of particle: nanodiamonds, functionalized nanodiamonds, polycrystalline nanodiamonds, single crystal nanodiamonds, aggregates of nanodiamond primary particles, nanodiamonds surrounded by a $sp^2$ carbon shell, buckydiamonds, carbon onions containing a nanodiamond core, and detonation soot containing nanodiamonds. The additive also includes at least one dispersion stabilizer that aids in stably suspending the colloidal nanocarbon particles in the base fuel. Then, the process involves operating the internal combustion engine using the mixture as fuel.

In certain example implementations, the fuel additive further includes at least one of an antifriction component, an antiwear component, a cetane improver component, a lubricating component, a detergent component and a fuel catalyst component. In certain example implementations, the base fuel can be a mixture of at least one fuel selected from: kerosene, gasoline, diesel fuel, naptha and ethanol; and at least one fluid selected from: mineral oil, castor oil, a synthetic oil, a semi-synthetic oil, a semi-synthetic severely hydro cracked oil, and a fully formulated oil where the fuel to fluid ratio ranges from about 10:1 to about 100:1. The fuel additive may have the majority of the base fuel evaporated.

A method of production of a fuel additive consistent with the present teachings involves: providing a base fuel; providing nanocarbon particles, where the nanocarbon particles are at least one type of particle selected from: nanodiamonds, functionalized nanodiamonds, polycrystalline nanodiamonds, single crystal nanodiamonds, aggregates of nanodiamond primary particles, nanodiamonds surrounded by a $sp^2$ carbon shell, buckydiamonds, carbon onions containing a nanodiamond core, and detonation soot containing nanodiamonds. At least one dispersion stabilizer is provided that aids in stably suspending the nanocarbon particles in the base fuel. A first solvent is provided. A dispersion of the nanocarbon particles and the dispersion stabilizer in the first solvent is created and the dispersion is homogenized to produce a homogenized dispersion. The base fuel is added to the homogenized dispersion and the combination is blended. The first solvent is then evaporated solvent to produce an evaporate which serves as the fuel additive.

In certain example implementations, the first solvent can be for example water, butanol, or a mixture of water with butanol. In certain example implementations, the fuel additive includes further diluting the evaporate to a desired concentration of nanocarbon particles.

In certain example implementations, the method further involves providing a second solvent containing a second dispersion stabilizer. Prior to adding the base fuel, the second solvent is added to the homogenized dispersion of nanocarbon particles and the first solvent. Homogenizing the dispersion can include homogenizing the dispersion containing both the first and second solvent to produce a homogenized dispersion containing the first and second solvents. Adding the base fuel to the homogenized dispersion can include adding the base fuel to the homogenized dispersion containing the first and second solvent.

Treated fuel in accord with certain embodiments includes a fuel and a fuel additive added to the fuel. The fuel additive includes a base fuel and colloidal nanocarbon particles. The colloidal nanocarbon particles include at least one type of particle selected from: nanodiamonds, functionalized nanodiamonds, polycrystalline nanodiamonds, single crystal nanodiamonds, aggregates of nanodiamond primary particles, nanodiamonds surrounded by a $sp^2$ carbon shell, buckydiamonds, carbon onions containing a nanodiamond core, and detonation soot containing nanodiamonds. At least one dispersion stabilizer is included that aids in stably suspending the colloidal nanocarbon particles in the base fuel.

In certain example implementations, the fuel is at least one of: kerosene, gasoline, diesel fuel, fully formulated gasoline fuel, fully formulated diesel fuel, marine fuel, avionic fuel, aviation fuel, jet fuel, organic combustible liquid, alcohol fuel, hydrocarbon fuel, fossil fuel, petroleum, liquid petroleum gas, coal tar, biofuel, biodiesel, phenols, polycyclic aromatic hydrocarbons, heterocyclic hydrocarbon compounds, renewable fuel, fuel mixtures, mixtures of fuel and oil (e.g., two stroke engine fuel), and fully formulated fuel. In certain example implementations, the fuel additive may also include at least one additive component selected from: an antifriction component, an antiwear component, a cetane improver component, a lubricating component, a detergent component and a fuel catalyst component. In certain example implementations, the colloidal nanocarbon particles concentration in the treated fuel is between approximately 0.00001 wt % and 1 wt %. In certain example implementations, the colloidal nanocarbon particles concentration in the treated fuel is between approximately 0.00001 wt % and 0.1 wt %.

In certain example implementations, the fuel is a fully formulated fuel and the fuel additive makes up about $10^{-6}$ vol % to 20 vol % in the mixture, and the fully formulated fuel can be at least one of: a liquid fuel, fossil fuel, hydrocarbon fuel, alcohol fuel, ethanol, kerosene, gasoline, diesel fuel, a mixture of oil and fuel, and biodiesel fuel. In certain example implementations, the fuel can be a fully formulated fuel and the fuel additive makes up about $10^{-6}$ vol % to 20 vol % in the mixture, where the fully formulated fuel is selected from at least one of: a liquid fuel, fossil fuel, hydrocarbon fuel, alcohol fuel, ethanol, kerosene, gasoline, diesel fuel and biodiesel fuel. In certain example implementations, the majority of the base fuel has been evaporated.

In certain example implementations, the fuel can also include oil. In certain example implementations, the oil may be selected from: mineral oil, a synthetic oil, a semi-synthetic oil, a semi-synthetic severely hydro cracked oil, and a fully formulated oil. The treated fuel may be two stroke engine fuel or other fuel for combustion engines. In certain implementations, the base fuel may be oil and the treated fuel may be oil, fuel or a mixture of oil and fuel.

Many variations of the present teachings will occur to those skilled in the art upon consideration of the present teachings.

All references, including publications, patent applications, patents, and website content cited herein are hereby incorporated by reference to the same extent as if each reference were individually and specifically indicated to be incorporated by reference and was set forth in its entirety herein.

While certain illustrative embodiments have been described, it is evident that many alternatives, modifications, permutations and variations will become apparent to those skilled in the art in light of the foregoing description.

What is claimed is:

1. A combustion fuel additive for use in a fully formulated combustion fuel, the additive designed for improving the fully formulated combustion fuel's efficiency when the fuel combusts in an engine, the combustion fuel additive comprising:
   a) a base fuel for dispersion in the fully formulated combustion fuel;
   b) colloidal nanodiamond particles, wherein the colloidal nanodiamond particles are dispersed in the base fuel; and
   c) a surfactant dispersion stabilizer that aids in stably suspending the colloidal nanodiamond particles in the base fuel which surfactant dispersion stabilizer is dispersible in the fully formulated combustion fuel,
   where the colloidal nanodiamond particles comprise nanodiamonds modified by at least one modification selected from the group consisting of: a wet phase chemical reaction, gas phase chemical reaction, a chemical reaction induced photochemically, a chemical reaction induced electrochemically, a chemical reaction induced mechanochemically, annealing, modification by exposure to a plasma, modification by irradiation, modification by exposure to sonic energy and a modification during a process of nanodiamond synthesis by introducing dopants or defects.

2. The fuel additive composition according to claim 1, where the colloidal nanodiamond particles comprise at least one type of particle selected from the group consisting of: nanodiamonds, functionalized nanodiamonds, polycrystalline nanodiamonds, single crystal nanodiamonds, aggregates of nanodiamond primary particles, nanodiamonds surrounded by a $sp^2$ carbon shell, buckydiamonds, carbon onions containing a nanodiamond core, and detonation soot containing nanodiamonds.

3. The fuel additive composition according to claim 1, where the colloidal nanodiamond particles further comprise carbon onions derived from nanodiamonds.

4. The fuel additive composition according to claim 1, where the base fuel comprises at least one fluid selected from the group consisting of: liquid fuel, kerosene, gasoline, diesel fuel, marine fuel, avionic fuel, organic combustible liquid, alcohol fuel, hydrocarbon fuel, petroleum, liquid petroleum gas, coal tar, biofuel, biodiesel, phenols, polycyclic aromatic hydrocarbons, heterocyclic hydrocarbon compounds, renewable fuel, benzene, toluene, xylene, polybutenes, polyglycols, naphtha, fuel oil, naphthalene and fuel mixtures.

5. The fuel additive composition according to claim 1, where the base fuel comprises at least one fuel selected from the group consisting of: kerosene, gasoline, mixture of oil and fuel, diesel fuel, naphtha and ethanol.

6. The fuel additive composition according to claim 1, where the base fuel comprises at least one fluid selected from the group consisting of mineral oil, a synthetic oil, a semi-synthetic oil, a semi-synthetic severely hydro cracked oil, and a fully formulated oil.

7. The fuel additive composition according to claim 1, where the nanodiamonds contain at least one material selected from the group consisting of:
   nanodiamond comprising carboxylic, hydroxylic, amine, hydrogen, fluorine-containing and halogen-containing surface groups.

8. The fuel additive composition according to claim 1, where the dispersion stabilizer comprises a fluorine containing oligomeric dispersant.

9. The fuel additive composition according to claim 8, where the fluorine containing oligomeric dispersant comprises at least one dispersant selected from the group consisting of: a fluorine-containing monoester of alkylsuccinic acid, isomers of fluorine-containing monoester of alkylsuccinic acid and a fluorine-containing diester of alkylsuccinic acid.

10. The fuel additive composition according to claim 1, where the base fuel comprises a solid fuel or gaseous fuel.

11. The fuel additive composition according to claim 1, where the colloidal nanodiamond particle concentration in the fuel additive is between approximately 0.0001 wt % and 10 wt %.

12. The fuel additive composition according to claim 1, where the colloidal nanodiamond particles are further combined with 1-dimensional or 2-dimensional nanocarbon-based materials.

13. The fuel additive composition according to claim 12, which further comprises nanocarbon-based materials comprising at least one material selected from the group consisting of: carbon nanotubes, graphene, oxidized graphene, graphite nanoplatelets and oxidized graphite nanoplatelets.

14. The fuel additive composition according to claim 1, where the colloidal nanodiamond particles are combined with metal nanoparticles and metal oxide nanoparticles.

15. The fuel additive composition according to claim 1, further comprising at least one component selected from the group consisting of: an antifriction component, an antiwear component, a cetane improver component, a lubricating component, a detergent component and a fuel catalyst component.

16. The fuel additive composition according to claim 15, where the colloidal nanodiamond particle concentration in the fuel additive is between approximately 0.0001 wt % and 10 wt %.

17. The fuel additive composition according to claim 15, where the colloidal nanodiamond particles are combined with 1-dimensional or 2-dimensional nanocarbon based materials.

18. The fuel additive composition according to claim 17, which further comprise one or more of the nanocarbon-based materials selected from the group consisting of: carbon nanotubes, graphene, oxidized graphene, graphite nanoplatelets and oxidized graphite nanoplatelets.

19. The fuel additive composition according to claim 15, which further comprises at least one metal catalyst or metal catalyst compound selected from the metal catalyst group consisting of: Mg, Ca, Ce, rare earth element, Fe, Co, Ni, Cu, Cr, Mn, Pt; or metal catalyst compound group consisting of metal oxide, metal carbonate, metal hydrocarbonate, metal sulfonate, metal hydroxide, metal carboxylate, nickel oleate, nickel naphthenate, nickel alkyl phenates, nickel alkyl sulfonate, nickel stearate.

20. The fuel additive composition according to claim 19, where the metal catalyst or metal catalyst compound comprises nanoparticles with average particle sizes from about 1 nm to 1000 nm.

21. The fuel additive composition according to claim 15, where the component comprises from 0.1 vol % to 90 vol % of the additive.

22. The fuel additive composition according to claim 1, where the base fuel comprises a mixture of at least one fuel selected from the group consisting of Kerosene, gasoline, diesel fuel, naptha and ethanol; and at least one fluid selected from the group consisting of mineral oil, castor oil, a synthetic oil, a semi-synthetic oil, a semi-synthetic severely hydro cracked oil, and a fully formulated oil where the fuel to fluid ratio ranges from about 10:1 to about 100:1.

23. The fuel additive composition according to claim 1, where the majority of the base fuel has been evaporated.

24. The fuel additive composition combined with fully formulated combustion fuel according to claim 1, where the fuel comprises at least one liquid fuel selected from the group consisting of: kerosene, gasoline, diesel fuel, fully formulated gasoline fuel, fully formulated diesel fuel, marine fuel, avionic fuel, aviation fuel, jet fuel, organic combustible liquid, alcohol fuel, hydrocarbon fuel, fossil fuel, petroleum, liquid petroleum gas, coal tar, biofuel, biodiesel, phenols, polycyclic aromatic hydrocarbons, heterocyclic hydrocarbon compounds, renewable fuel, fuel mixtures, mixtures of fuel and oil, and fully formulated fuel.

25. A combustion fuel additive for use in a fully formulated combustion fuel, the additive designed for improving the fully formulated combustion fuel's efficiency when the fuel combusts in an engine, the combustion fuel additive comprising:
   a) a base fuel for dispersion in the fully formulated combustion fuel;
   b) colloidal nanodiamond particles, wherein the colloidal nanodiamond particles are dispersed in the base fuel; and
   c) a surfactant dispersion stabilizer that aids in stably suspending the colloidal nanodiamond particles in the base fuel which surfactant dispersion stabilizer is dispersible in the fully formulated combustion fuel,
where the dispersion stabilizer comprises at least one surfactant selected from the group consisting of zwitterionic surfactants, non-ionic surfactants, ionic surfactants, cationic surfactants, anionic surfactants and steric surfactants.

26. The fuel additive composition according to claim 25, where the surfactant comprises at least one surfactant selected from the group consisting of: cocamidopropyl betaine, sorbitan monoester, sorbitan diester, sorbitan trimester, sorbitan monostearate, sorbitan monooleate, sorbitan trioleate, glyceryl monoester, glyceryl monostearate, glyceryl monooleate, dioctylsulfosuccinate sodium salt, polyolefin alkyl phenol alkyl amine, polymerized fatty acids, N-acyl sarcosine, polyether, imidazoline, amides, polyamides and polyalkylene amine.

27. The fuel additive composition according to claim 25, where the dispersion stabilizer comprises a surfactant with a hydrophilic-lipophilic balance of approximately 1 to 40.

\* \* \* \* \*